(12) United States Patent
Naruse et al.

(10) Patent No.: US 7,008,712 B2
(45) Date of Patent: Mar. 7, 2006

(54) SPLIT CELL TYPE FUEL CELL STACK

(75) Inventors: Yukio Naruse, Inuyama (JP); Noboru Ohwaki, Inuyama (JP); Shoji Nawa, Inuyama (JP); Yasuo Ido, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 341 days.

(21) Appl. No.: 10/368,264

(22) Filed: Feb. 18, 2003

(65) Prior Publication Data
US 2003/0180600 A1 Sep. 25, 2003

(30) Foreign Application Priority Data
Mar. 22, 2002 (JP) .............................. 2002-080311

(51) Int. Cl.
*H01M 8/02* (2006.01)
(52) U.S. Cl. .............................. 429/32; 429/35; 429/37
(58) Field of Classification Search .................. 429/30, 429/32, 35, 37
See application file for complete search history.

(56) References Cited

U.S. PATENT DOCUMENTS

| 5,514,486 | A | * | 5/1996 | Wilson | ......................... 429/30 |
| 5,595,834 | A | * | 1/1997 | Wilson et al. | ................. 429/30 |
| 6,423,437 | B1 | * | 7/2002 | Kenyon et al. | ............. 429/32 |
| 6,773,843 | B1 | * | 8/2004 | Kitagawa et al. | ............. 429/32 |
| 2002/0127453 | A1 | * | 9/2002 | Kitagawa et al. | ............. 429/32 |

FOREIGN PATENT DOCUMENTS

| DE | 27 06 310 | 2/1977 |
| DE | 699 05 019 | 2/1999 |
| EP | 0 704 109 | 6/1994 |
| GB | 2 373 093 A | 11/2002 |
| GB | 2 373 093 B1 | 11/2002 |
| JP | A-2002-270212 | 9/2002 |

* cited by examiner

Primary Examiner—Mark Ruthkosky
(74) Attorney, Agent, or Firm—Rader, Fishman & Grauer PLLC

(57) ABSTRACT

There is provided a split cell type fuel cell stacks having a thin design and high-voltage and low-current output characteristics, in which a cell portion is divided into a plurality of sections electrically insulated from one another at both sides of a polymer electrolyte membrane. This fuel cell stack includes end plates, a unit cell provided between the end plates, a fuel distribution manifold provided in a central portion of the unit cell for supplying fuel thereto, a single tie bolt passing through a central portion of the fuel distribution manifold and the central portion of the unit cell so as to clamp the fuel cell components together into a unitary construction, and fixing nuts threaded respectively on both end portions of the tie bolt through washers, O-rings or the like to clamp the unit cell between the end plates. The cell portion includes a polymer electrolyte membrane, an oxygen electrode and a fuel electrode disposed oppositely on both sides of the polymer electrolyte membrane, a flow field plate disposed adjacent to the oxygen electrode, and a pair of separator plates contacting an outer side of the flow field plate and an outer side of the fuel electrode, respectively. Each of the fuel electrode and the separator plates, disposed on one side of the polymer electrolyte membrane, and each of the oxygen electrode, the oxygen flow field plate and the separator plate disposed on the other side thereof are divided into sections electrically insulated from one another.

4 Claims, 3 Drawing Sheets

SPLIT CELL TYPE FUEL CELL STACK

CROSS-REFERENCE TO RELATED APPLICATIONS

This application claims priority based on Japanese Application No. 2002-080311, filed Mar. 22, 2002.

BACKGROUND OF THE INVENTION

This invention relates to a split cell type fuel cell stack which can be used as a power source or an electric generator for various applications such as outdoor, recreation and household applications and also for a business machine and the like, and is formed into a thin type, using a solid polymer fuel cell stack which is quiet, lightweight and pollution-free.

Generally, fuel cell stacks use hydrogen as main fuel and take out the energy generated during the chemical reaction of this hydrogen with oxygen. There are several types of fuel cell stacks, and one type of them is a solid polymer electrolyte fuel cell stack. This solid polymer electrolyte fuel cell stack has features such as low operating temperature and high output density.

An example of such conventional solid polymer electrolyte fuel cell stack is disclosed in U.S. Pat. No. 5,595,834 or Japanese Patent Application No. 2001-66109 which is a patent application filed earlier by the Applicant of the present application. In such a fuel cell stack shown in FIG. 3, an anode (fuel electrode) 13a and a cathode (oxygen electrode) 13b are provided on both sides of a solid polymer electrolyte membrane 12, and an oxygen flow field plate 18 which are provided adjacent to the oxygen electrode 13b, and separator plates 34, which is provided respectively on both sides of the fuel electrode 13a and the oxygen flow field plate 18, to form the unit cell 10 by making them integral with each other. A plurality of unit cells 10 is stacked together. Such separator plates, having terminals for outputting generated power, serve as current collector plates 35a and 35b. A fuel distribution manifold 32, forming of a hydrophilic sleeve, is provided to pass through a central hole in each unit cell 10, and is in communication with the fuel electrode 13a of each unit cell, and end plates 24 are provided respectively at both end portions of a tie bolt 26, passing through the center or axis of the sleeve, to sandwich them between the two ends of the tie bolt 26, and these fuel cell components are fastened and fixed together into a unitary construction by nuts 40 and 50 via washers and O-rings 36. Such fuel cell stacks are suitable for low power fuel cell stacks, and therefore can be designed as small-sized and lightweight fuel cell stacks.

In this polymer electrolyte fuel cell stack, fuel is supplied to the fuel electrode 13a through a central portion of the nut 40, and is distributed via the hydrophilic sleeve forming the fuel distribution manifold 32.

However, the above conventional solid polymer electrolyte fuel cell stack is used as a power source of a small-size equipment or the like, and therefore need to be formed into a smaller and thinner design while maintaining high-voltage and low-current characteristics.

When it is required to generate a high voltage, it is necessary to stack many cells together, and therefore it is difficult to achieve a thin design of a fuel cell. In order that the fuel cell can be used as a power source of a business machine or the like, it is necessary t o obtain a low current with a high voltage, and it is necessary to reduce the size of the cell portion, and when the outer size thereof is thus reduced, difficulty has been encountered in the production of the fuel cell stack since fuel, i.e. hydrogen is supplied from the center axis portion.

SUMMARY OF THE INVENTION

The present invention was made in view of the above problem. Accordingly, it is an object of this invention to provide a split cell type fuel cell stack which is formed into a small and lightweight design so as to solve the problem encountered in the production.

Another object of the invention is to provide a split cell type fuel cell stack which is formed into a thin design so that it can be suitably used for a high-voltage, low-current small-size equipment According to a first aspect of the invention for achieving the above objects, there is provided a split cell type fuel cell stack in which a plurality of sections, electrically insulated from one another, is formed by separating a cell portion at each side of a polymer electrolyte membrane.

The following functions are achieved by this first aspect of the invention.

(1) The plurality of sections functions as unit cells (single cells), respectively, and therefore each section can function as the unit cell so that a high-voltage and low-current output can be obtained, and this output can be obtained with the same size as that of a conventional single cell, and therefore the number of unit cells, disposed in the same plane, can be increased, and therefore the number of cell portions can be reduced, so that the fuel cell can be formed into a thin design.

(2) In order to provide a fuel cell stack capable of producing a high-voltage and low-current output, it has heretofore been necessary to reduce the area of each of a polymer electrolyte membrane, a fuel electrode, an oxygen electrode, separator plates, etc., in each unit cell having a fuel distribution manifold disposed in a central portion thereof so as to supply fuel thereto, and also it has been necessary to provide many unit cells. In the present invention, however, a plurality of unit cells is provided at a cell portion in a common plane, and by doing so, the problem, encountered in the production, can be solved.

The present invention has a second aspect that the plurality of sections is formed by dividing the fuel electrode, the oxygen electrode, the oxygen flow passage plate and each of the separator plates.

(3) In this second aspect, the fuel electrode, the oxygen electrode, the oxygen flow field plate and each separator plate except the polymer electrolyte membrane are separated, and therefore each separated section functions as a unit cell, and therefore by forming the cell portion into a required size, the fuel cell, having a high-voltage and low-current performance, can be easily obtained.

The present invention has a third aspect that the separated portions of the fuel electrode are separated from one another by an outer seal made of an electrically-insulating material, while the separated portions of the oxygen electrode, as well as the separated portions of the oxygen flow field plate, are separated from one another by an inner seal made of an electrically-insulating material.

(4) In this third aspect, the sections are separated from one another by the electrically-insulating seals, and therefore each of the sections, separated from one another by radially outwardly-extending portions of the inner seal and radially inwardly-extending portions of the outer seal, each fitted in the corresponding boundary region between the adjacent sections, can positively perform the predetermined function as a unit cell.

DETAILED DESCRIPTION OF THE INVENTION

A preferred embodiment of the present invention will now be described in detail with reference to the drawings.

Figure 1:
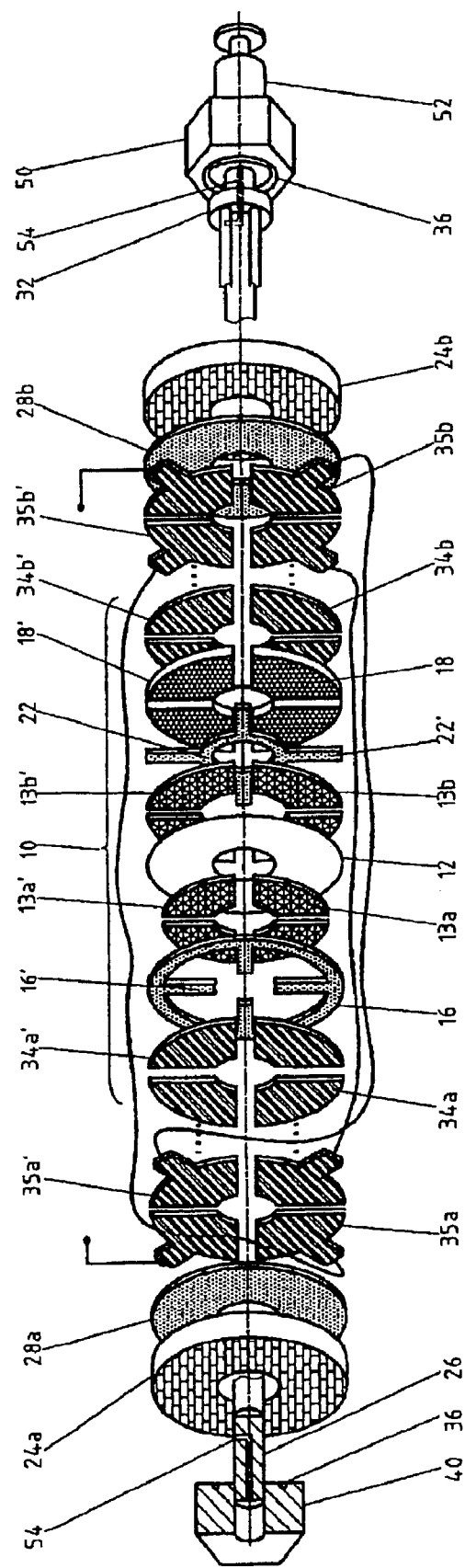
FIG. 1 is an exploded, perspective view of a split cell type fuel cell stack according to an prepared embodiments of the present invention.
Figure 2:
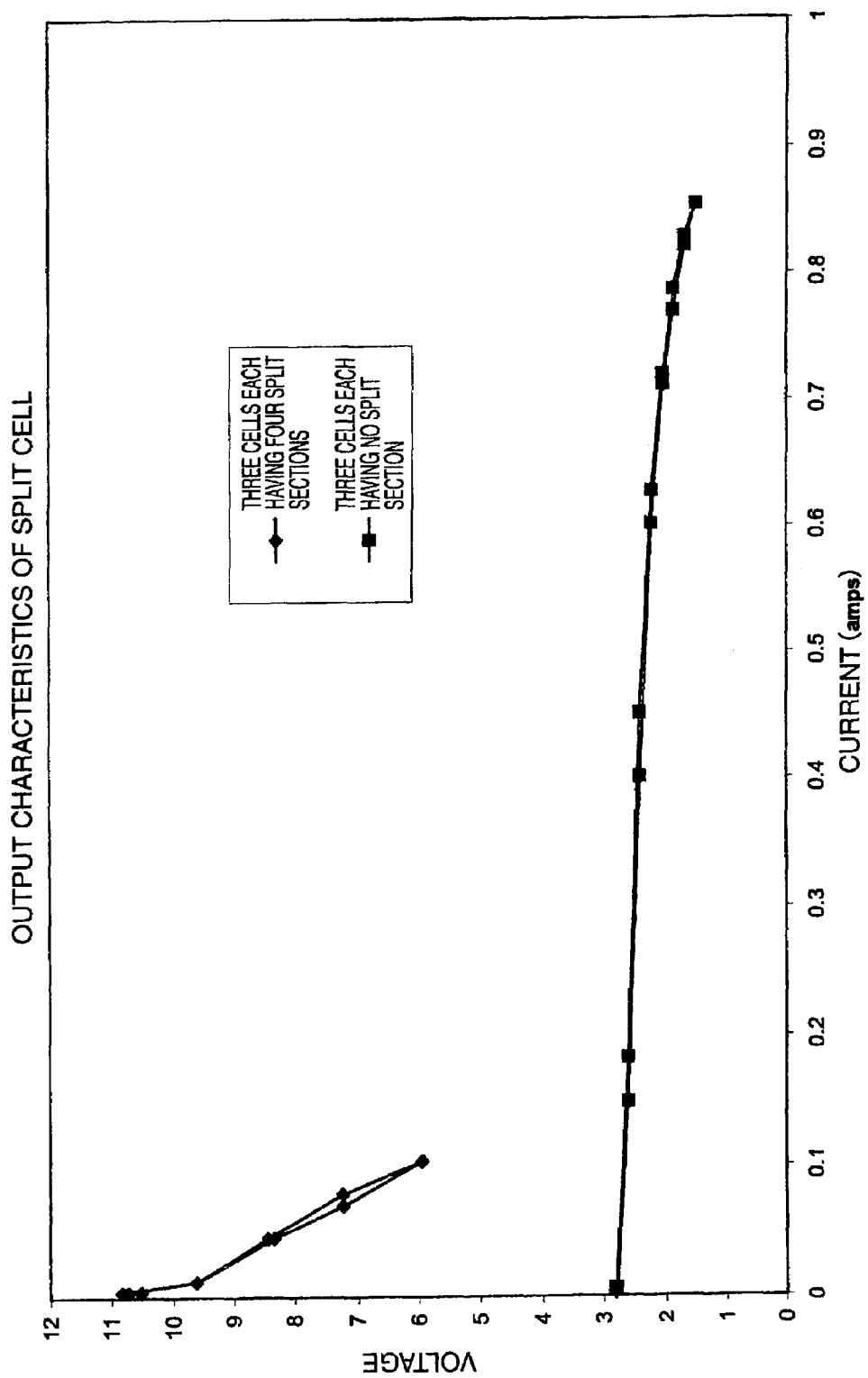
FIG. 2 is a graph showing output characteristics of the split cell type fuel cell stack of FIG. 1

FIG. 1 is an exploded, perspective view of one preferred embodiment of a split cell type fuel cell stack of the invention in a disassembled condition, and FIG. 2 is a diagram in which the performance of a conventional fuel cell stack is compared with the performance of the split cell type fuel cell stack of the invention. This split cell type fuel cell stack is called a solid polymer electrolyte fuel cell stack using fuel such as hydrogen. This fuel cell stack includes a cell portion 10 separated by an inner seal 22, in which the cell portion 10 has a solid polymer electrolyte membrane 12, which is made of a perfluorocarbon sulfonic acid polymer material and has a thickness of 0.05 mm, a fuel electrode 13a, which is made of a sheet-like carbon material and has a thickness of 0.5 mm, an inner diameter of 15 mm and an outer diameter of 45 mm, and an oxygen electrode 13b, which is made of a sheet-like carbon material and has a thickness of 0.5 mm, an inner diameter of 19 mm and an outer diameter of 55 mm, provided respectively on opposite sides of the solid polymer electrolyte membrane 12, an oxygen flow field plate 18 which is made of a carbon material has a thickness of 3.5 mm, an inner diameter of 19 mm and an outer diameter of 55 mm provided on an outer side of the oxygen electrode 13b, an annular outer seal 16, having an electric insulation, which is made of synthetic rubber such as EPDM and has a width of 5 mm, sealing an outer periphery of the fuel electrode 13a, an inner seal 22 which is made of synthetic rubber such as EPDM and has a width of 2 mm, sealing inner peripheries of the oxygen electrode 13b and oxygen flow field plate 18, and separator plates 34, each of which is made of stainless steel, and has a thickness of 0.3 mm and a diameter larger than those of the other components, between which the above components are interposed.

In the above fuel cell stack, a plurality of split sections is formed at the both sides of the solid polymer electrolyte membrane 12, and at that side including the fuel electrode 13a, this fuel electrode 13a, as well as the separator plate 34a, is equally divided into four sections, and four seal portions (electrically-insulating portions), formed integrally with and extending from the outer seal 16, are respectively fitted and held in boundary regions each between the adjacent separated portions of the fuel electrode 13a and also in boundary regions each between the adjacent separated portions of the separator plate 34a. On the other hand, at that side including the oxygen electrode 13b, each of the oxygen electrode 13b, the oxygen flow field plate 18 and the separator plate 34b is equally divided into four portions, and four seal portions, i.e. electrically-insulating portions, formed integrally with and extending from the inner seal 22, are respectively fitted and held in boundary regions each between the adjacent separated portions of each of the oxygen electrode 13b, the oxygen flow field plate 18 and the separator plate 34b. In this manner, the plurality of separated sections is formed. The separator plate 34a, the fuel electrode 13a, the oxygen electrode 13b, the oxygen flow passage plate 18 and the separator plate 34b, each thus divided into the four division portions, are disposed in the same plane to form the cell portion 10, and the separated sections function as unit cells (single cells), respectively, and can have the high-voltage, low-current output performance.

In the above embodiment, fuel is mainly hydrogen, and oxygen is oxygen in the air, and is fed as the air. The solid polymer electrolyte membrane 12 is provided with a catalyst for chemical reaction. The supply of fuel will be described below, and although fuel can be supplied, using nuts 40 and 50, fuel may be directly supplied via a communication hole formed in a central portion of a tie bolt 26 along an,axis thereof as shown in FIG. 1.

The tie bolt 26, having the central hole and having a diameter of 6 mm and a suitable length, is used to clamp the components of the cell portion 10 together into a unitary construction, and more specifically a fuel distribution manifold 32, formed of hydrophilic synthetic fiber yarns made of aromatic polyamide (KEVLAR) (trade name), is fitted on this tie bolt 26, and extends along the axis thereof, and this tie bolt 26 extends through the cell portion 10. An end gasket 28a, 28b, made of synthetic rubber such as EPDM, is sandwiched between each of the separator plates 34a and 34b (provided respectively at the both ends of the cell portion 10) and an end plate 24a, 24b, and the stainless steel nuts 40 and 50 are threaded respectively on threaded portions, formed respectively at opposite end portions of the tie bolt 26, in facing relation respectively to the end plates 24a and 24b each made of an epoxy resin and having a thickness of 10 mm, an inner diameter of 15 mm and an outer diameter of 55 mm, and by doing so, the components of the cell portion 10 can be clamped together into a unitary construction.

Figure 3:
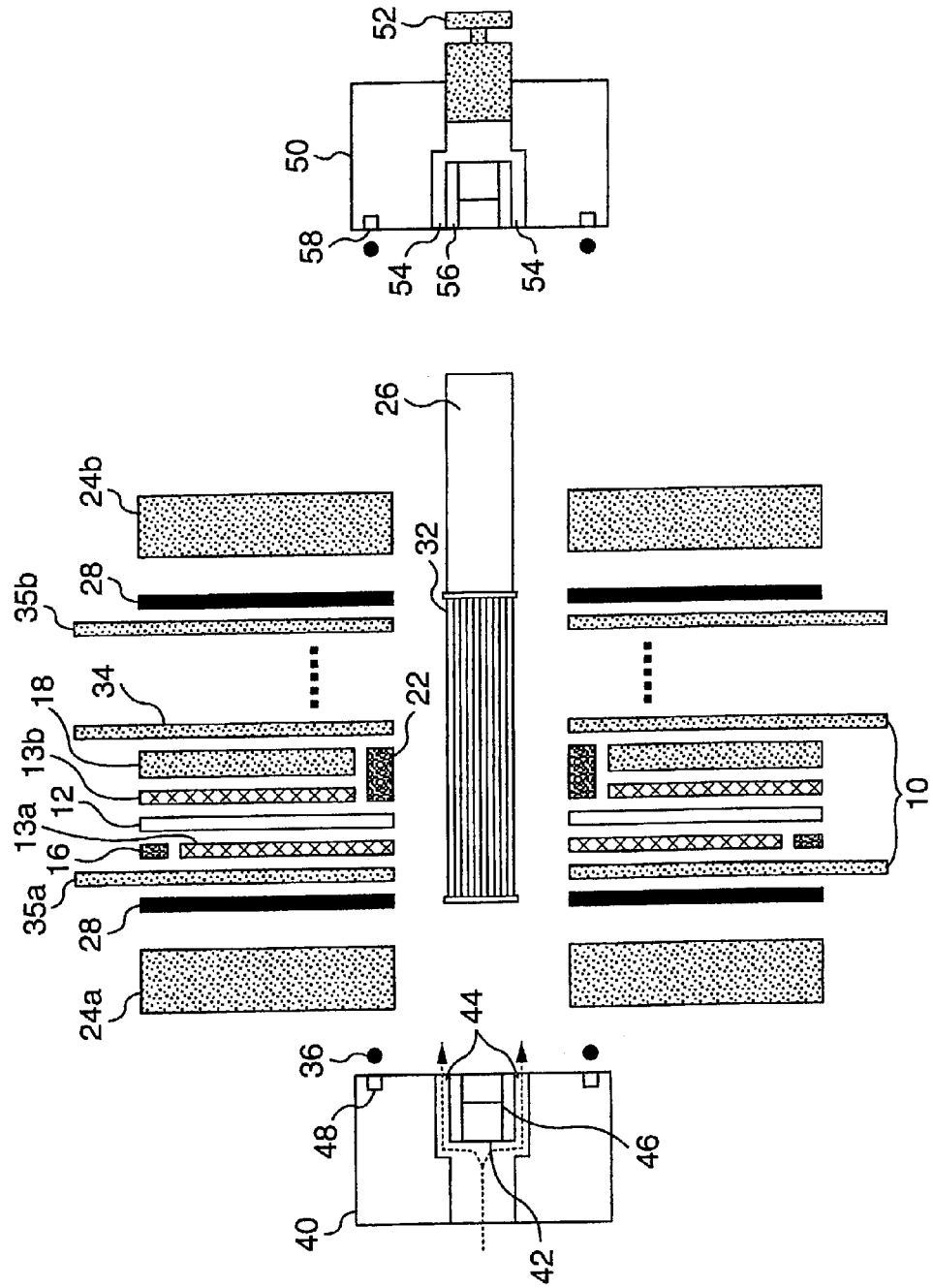
FIG. 3 is an exploded, schematic view of a conventional solid polymer electrolyte fuel cell stack.

As shown in FIG. 3 showing the conventional example, the nut 40 for clamping the components of the cell portion 10 together has a hollow hole 42 formed through a central portion thereof, and an internally-threaded portion 46 is formed on an inner surface of this hollow hole, and extends axially to a central portion of this inner surface from that side of the nut 40 facing the end plate 24a, and the tie bolt 26 can be threaded into this internally-threaded hole. At least two fuel flow passages 44 are provided radially outwardly of the internally-threaded portion 46, and communicate with the hollow hole 42, and serve as fuel supply ports for supplying fuel to the fuel distribution manifold. A circular groove 48, in which an O-ring 36 is fitted, is formed in that side of the nut 40 facing the end plate 24a.

As shown in FIG. 3, an internally-threaded portion 56 is formed in the other nut 50, and extends axially to a central portion thereof as in the nut 40, so that the threaded end portion of the tie bolt 26 can be threaded into this internally-threaded portion 56, and communication holes 54 for communicating with the fuel distribution manifold are formed radially outwardly of this internally-threaded portion 56. A bleeder valve 52 of stainless steel, which enables the charging of fuel by purging the residual air with a one-touch operation at the time of starting the operation, is mounted on that side of the nut 50 facing away from the internally-threaded portion 56 in the axial direction, and fuel can be charged and discharged relative to the fuel distribution manifold 32 and the fuel electrode 13a through the communication holes 54 so as to assist in charging the fuel. A circular groove 58 is formed in that side of the nut 50 facing the end plate 24b, and an O-ring is fitted in this circular groove.

The fuel distribution manifold 32 is provided for supplying fuel and for absorbing and holding produced water, and this fuel distribution manifold 32 is formed by retaining hydrophilic synthetic fiber yarns on flanges, formed respectively at both ends of a tubular housing, in such a manner that these synthetic fiber yarns are arranged around a surface of the cylindrical housing, and extend between the two flanges along an axis thereof.

The split cell type fuel cell of the above construction can be assembled in the following manner.

First, a nut 40 is beforehand attached to one end portion of a tie bolt 26, and preferably in a vertically-erected condition of the tie bolt 26, a fuel distribution manifold 32 is fitted on the tie bolt 26. The tie bolt 26, thus having the fuel distribution manifold 32 fitted thereon, forms a center shaft of the fuel cell.

Outermost end plate 24a and end gasket 28a are fitted at their center holes on this center shaft in this order, and then in order to form a cell portion 10, a four-separated separator plate 34a, an outer seal 16 disposed radially outwardly of a fuel electrode 13a, having radially inwardly-extending seal portions 16' fitted respectively in the boundary regions, each between the adjacent separated portions, the four separated fuel electrode 13a, a solid polymer electrolyte membrane 12, a four-separated oxygen electrode 13b, an inner seal 22, having seal portions 22' (extending radially outwardly of the inner periphery of the oxygen electrode 13b) fitted respectively in the boundary regions each between the adjacent division portions, a four-separated oxygen flow field plate 18, and a four-divided separate plate 34b are provided in such a manner that the split portions of each of the four-separated components are assembled together, and then the above components are sequentially fitted at their central holes on the center shaft, and are stacked together, thereby assembling the cell portion. In this condition, the separator plates, disposed adjacent respectively to the end gaskets 28a and 28b, serve as current collector plates 35a and 35b, respectively.

Each of the separator plates 34a and 34b is separated as in the fuel electrode 13a, the oxygen electrode 13b and the oxygen flow field plate 18, and in the assembled condition, separated portions 34a' of the separator plate 34a are disposed in opposed relation to separated portions 13a' of the fuel electrode 13a, respectively, while separated portions 34b' of the separator plate 34b are disposed in opposed relation to separated portions 18' of the oxygen flow field plate 18, respectively.

Thereafter, if necessary, in order to form the next cell portion 10, with respect to the rear separator plate 34b of the preceding cell portion 10, an outer seal 16 disposed radially outwardly of a fuel electrode 13a, the fuel electrode 13a, a solid polymer electrolyte membrane 12, an oxygen electrode 13b, an inner seal 22, an oxygen flow passage plate 18, and a separator plate 34 are sequentially fitted at their central holes on the center shaft, and are assembled together in such a manner that the split portions of each of the separated components are disposed in a plane, as described above for the preceding cell portion 10. This cell portion-assembling operation is repeated so that a required number of cell portions 10, corresponding to a required output of the split cell type fuel cell, can be stacked and assembled together.

Finally, an end plate 24b is fitted at its center hole on the center shaft, and is stacked on the separator plate 34 of the outermost cell portion 10, with an end gasket 28b held therebetween. This stack of cell portions 10 is held together at a predetermined pressure, for example, of about 1.5 MPa. In this condition, the other nut 50, having a bleeder valve 52 attached thereto, is threaded on the threaded end portion of the tie bolt 26 forming the center shaft, and the stack is tightened with a predetermined torque, for example, of 6.8 Nm, and is fastened.

In order that the thus assembled fuel cell can serve as a split cell type fuel cell, a tube or the like is connected to the nut 40 so as to supply fuel thereto from a hydrogen-generating apparatus or the like. Fuel such as hydrogen is supplied to the fuel distribution manifold 32 via the hollow hole 42 serving as the fuel supply hole and the fuel flow passages 44 in the nut 40, and is fed to the inner peripheral edges of the four separated portions of the fuel electrode 13a of the cell portion 10 via the fuel distribution manifold 32 extending along the tie bolt 26. The fuel electrode 13a is formed of a separated sheet-like carbon material member so as to form the sections, and therefore the fuel can be fed radially outwardly from the inner peripheral edge of the fuel electrode 13a through pores in this porous material without the need for providing any fuel flow passage plate, and since the outer periphery of the fuel electrode 13a and their split portions are sealed by the outer seal 16 and the seal portions, extending radially inwardly therefrom, the fuel can be fed to be supplied to the solid polymer electrolyte membrane 12. The oxygen electrode 13b and the oxygen flow field plate 18 are provided on the opposite side of this solid polymer electrolyte membrane 12 in such a manner that the separated portions of the oxygen electrode 13b are opposed to the separated portions of the oxygen flow passage plate 18, respectively, and therefore the outside air is fed through pores in the oxygen flow passage plate 18 made of a porous material, and oxygen in the air is supplied to the separated portions of the oxygen electrode 13b.

The fuel and oxygen, thus fed respectively to the both sides of the solid polymer electrolyte membrane 12, chemically react with each other at this membrane 12, and the fuel electrode serves as a cathode while the oxygen electrode serves as an anode, and the current collector plates 35a' and 35b' are electrically connected together by wires, and an electric power-generating operation is effected so as to obtain electric output. In this case, the fuel electrode 13a, as well as the oxygen electrode 13b, is divided into the four sections, and therefore there is obtained the output of the cell determined in accordance with the area of each section serving as a unit cell (single cell), and therefore this fuel cell, providing the high-voltage and low-current output, can be suitably used for an electronic equipment employing semiconductors. Its characteristics will be clear from the graph of FIG. 2 which shows output characteristics of a 3-fuel cells each having four split sections of the invention and output characteristics of a 3-fuel cells each having no split section of a conventional example.

Although water and heat are produced because of hydration, the produced water is absorbed by the hydrophilic synthetic fiber yarns of the fuel distribution manifold, and therefore the produced water will not reside in the fuel distribution manifold, and hence will not prevent the supply of fuel to the fuel electrode. And besides, the water is evaporated by produced heat, and is dissipated into the atmosphere. The separator plates 34 are larger in radius than the other components, and therefore that portion of each separator plate 34, projecting radially outwardly beyond the other components, functions as a radiating fin for radiating the produced heat.

The dimensions of the fuel cell components of the above embodiment, as well the number of the division sections, are not limited to the illustrated values, but have been given merely by way of example, and can be determined in accordance with the required output depending on a selected application. The supply of fuel (hydrogen) to the cell portion 10 may be effected via the nut 40 (shown in FIG. 3) or may be effected via the tie bolt 26 shown in FIG. 1.

As described above, the split cell type fuel cell of the present invention, having the above construction, achieves the following advantageous effects.

In the above split cell type fuel cell stack, the fuel electrode and the oxygen electrode, together with the separator plates, are divided into the plurality of sections on the opposite sides of the polymer electrolyte membrane, and therefore the high-voltage and low-current output of the fuel cell is obtained as the characteristics of the separated sections (unit cells), and there is achieved an excellent advantage that there can be provided the thin fuel cell suitably used as a power source of a small-size business machine or the like.

The number of unit cell parts is reduced, and besides the sections of reaction between fuel and oxygen are obtained by dividing the conventional oxygen electrode, fuel electrode, etc., and therefore there are achieved advantages that the fuel cell, having the high-voltage and low-current characteristics, can be easily produced and that the thin fuel cell can be obtained without the need for stacking many unit cells.

What is claimed is:

1. A split cell type fuel cell stack comprising end plates; one or more unit cells, provided between said end plates; a fuel distribution manifold provided in a central portion of said unit cell or cells for supplying fuel thereto; a single tie bolt passing through a central portion of said fuel distribution manifold and the central portion of said unit cell or cells for clamping said fuel cell stack together into a unitary construction; and fixing nuts threaded respectively on both end portions of said tie bolt through respective O-rings to clamp said unit cell or cells between said end plates;

wherein said cell unit includes a polymer electrolyte membrane, an oxygen electrode and a fuel electrode disposed respectively on opposite sides of said polymer electrolyte membrane in opposed relation to each other, a flow field plate disposed adjacent to said oxygen electrode, and separator plates disposed respectively on an outer side of said flow field plate and an outer side of said fuel electrode; and wherein each said unit cell is divided into a plurality of sections in a same plane which are electrically insulated from one another, and are formed adjacent to said polymer electrolyte membrane.

2. A split cell type fuel cell stack according to claim 1, wherein said fuel electrode and said oxygen electrode are separated to each said sections by an outer seal or an inner seal made of an electrically-insulating material.

3. A split cell type fuel cell stack according to claim 1, wherein said plurality of sections is formed by separating said fuel electrode, said oxygen electrode, said oxygen flow field plate and said separator plates.

4. A split cell type fuel cell stack according to claim 3, wherein said fuel electrode and said oxygen electrode are separated to each said sections by an outer seal or an inner seal made of an electrically-insulating material.

* * * * *